United States Patent
Fortin et al.

(10) Patent No.: US 7,107,444 B2
(45) Date of Patent: *Sep. 12, 2006

(54) APPARATUS AND METHOD TO DECREASE BOOT TIME AND HIBERNATE AWAKEN TIME OF A COMPUTER SYSTEM

(75) Inventors: Michael R. Fortin, Redmond, WA (US); Cenk Ergan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/204,705

(22) Filed: Aug. 16, 2005

(65) Prior Publication Data

US 2005/0278523 A1  Dec. 15, 2005

Related U.S. Application Data

(63) Continuation of application No. 10/186,164, filed on Jun. 27, 2002.

(51) Int. Cl.
*G06F 9/24* (2006.01)
*G06F 9/445* (2006.01)
*G06F 15/177* (2006.01)
*G06F 12/06* (2006.01)

(52) U.S. Cl. .................. 713/2; 713/1; 713/100; 711/112; 711/113

(58) Field of Classification Search ............. None
See application file for complete search history.

(56) References Cited

U.S. PATENT DOCUMENTS 5,307,497 A * 4/1994 Feigenbaum et al. .......... 713/1
5,420,998 A * 5/1995 Horning ...................... 711/113
5,592,630 A * 1/1997 Yamagami et al. ......... 711/117
6,018,433 A * 1/2000 Thayne et al. ................ 360/69
6,073,232 A * 6/2000 Kroeker et al. ................ 713/1
6,101,601 A   8/2000 Matthews et al.
6,122,745 A * 9/2000 Wong-Insley ............... 713/300
6,209,088 B1* 3/2001 Reneris ......................... 713/1
6,438,750 B1* 8/2002 Anderson ...................... 713/1

(Continued)

OTHER PUBLICATIONS

Rosenblum, Mendel and Ousterhout, John K., "The Design and Implementation of a Log-structured File System," Proceedings of the Thirteenth ACM Symposium on Operating Systems Principles', ACM Press, New York, NY, Jul. 24, 1991.*

*Primary Examiner*—James K. Trujillo
(74) *Attorney, Agent, or Firm*—Marshall, Gerstein & Borun LLP

(57) ABSTRACT

A method and apparatus to decrease the boot time and the hibernate awaken time of a computer system is presented. Static and dynamic configuration data is stored in flash memory. The size of flash memory is selected so that the initialization time of the configuration data stored in the flash memory is approximately equal to the spin-up time of the disk drive where the operating system is stored. During power down or entry into a hibernate mode, the computer system determines the static and dynamic configuration data to be stored in flash memory based on a history of prior uses. Data is also stored in the flash memory during system operation to reduce the number of times the disk drive is spun up. When the computer system is powered up or awakened from hibernation, the configuration data in flash memory is initialized while the disk drive is spinning up.

18 Claims, 6 Drawing Sheets

U.S. PATENT DOCUMENTS 6,539,456 B1 * 3/2003 Stewart ........................ 713/2

2003/0212857 A1 * 11/2003 Pacheco et al. ............. 711/114

* cited by examiner

APPARATUS AND METHOD TO DECREASE BOOT TIME AND HIBERNATE AWAKEN TIME OF A COMPUTER SYSTEM

This is a continuation of U.S. application Ser. No. 10/186,164, filed Jun. 27, 2002, the entire disclosure of which is incorporated herein by reference.

FIELD OF THE INVENTION

This invention relates generally to computer systems and, more particularly, relates to shortening the time of initializing computer systems.

BACKGROUND OF THE INVENTION

Computers such as conventional personal computers often utilize a time-consuming initialization process in order to load and initiate the computer operating system. The operating system is typically stored on a rotating non-volatile media such as a magnetic hard disk (e.g., a hard drive). However, the computer's microprocessor executes instructions only from addressable memory such as DRAM or some other type of volatile electronic memory. In order to initialize this addressable memory, a small amount of non-volatile boot-up memory is typically provided in an EPROM (electronically programmable read-only memory) or similar device. When the computer is booted, a boot program stored in the non-volatile memory is used. The boot program contains code for reading an initial portion of the operating system on the hard disk that is responsible for loading and initializing the remaining portions of the operating system.

The transfer of the operating system from the hard drive is slow, particularly when the operating system is a large operating system. This is prevalent not only in booting the computer system, but also in restoring the computer system from hibernate mode. A significant factor in the transfer time is due to the disk drive spin up speed. A relatively small disk spinning at a relatively slow RPM requires 5 to 6 seconds to spin up and be usable. Larger disks such as multi-platter devices and those spinning at faster RPMs require 10 to 12 seconds or more to spin up. On server systems having hundreds or thousands of disk drives that spin up in a largely sequential manner, the disk spin up time can be over ninety percent of the total time to boot the server system.

Methods have been developed for increasing the speed in booting the computer system and restoring the computer system from hibernation. One example is disclosed in to Feigenbaum et al U.S. Pat. No. 5,307,497. The '497 patent teaches that a portion of an operating system can be stored in read-only memory (ROM) for fast access of the portion during power-on or reset. However, the portion stored in ROM can not be changed. In other words, the method disclosed in the '497 patent does not adapt to changing user preferences regarding operating system settings and applications used, to restoring the computer system from hibernation, or to updated or new versions of an operating system.

Another example developed by industry is storing the state of the computer memory to a backup memory that is separate from the disk drive and stores the entire computer memory. This backup memory is large because it stores the entire computer memory.

BRIEF SUMMARY OF THE INVENTION

The present invention decreases the boot time and the hibernate restore time of a computer system. Static and dynamic configuration data are stored in flash memory. The size of the static and dynamic configuration data stored in the flash memory is selected so that the initialization time of the configuration data is approximately equal to the spin-up time of the disk drive where the operating system is stored.

During power-down or entry into hibernate mode, the system stores the static and dynamic configuration data into the flash memory. The static and dynamic configuration data is based on a history of prior use and comprises data that does not require items stored on the disk drive. The dynamic configuration data is on a per-user basis.

The flash memory is used during system operation to buffer temporary files. When available resources on the flash memory falls below a threshold, the data stored in the flash memory is transferred to the disk drive. This reduces the number of times the disk drive is spun up when the system is operating.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
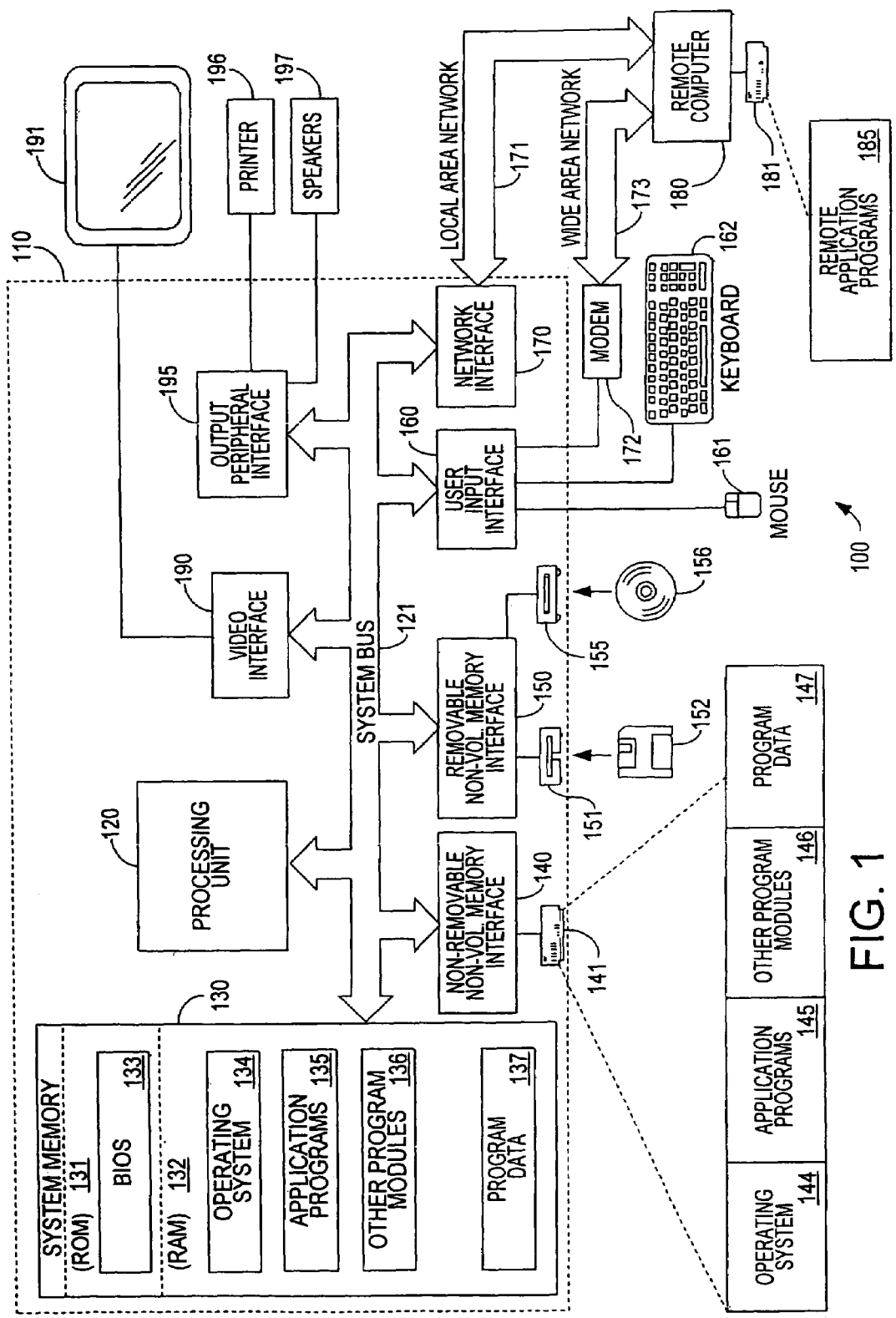
FIG. 1 is a block diagram generally illustrating an exemplary computer system on which the present invention resides.

The present invention decreases the boot time and the hibernate awaken time of a computer system. Static and dynamic configuration data are stored in nonvolatile memory technology such as flash memory. The flash memory may include battery-backed up memory. The flash memory may be located in a computer as a separate component of the computer such as a pc slot card or as a component in system memory. Alternatively, it could be a component of a persistent storage device such as a hard drive, in a docking station of a notebook device and the like. On mobile systems, the track buffer memory the disk drives have can be used (i.e., the invention can also be implemented using the track buffer memory). Future disks for mobile systems may draw from battery power to keep its memory alive without actually drawing power to keep the disk spinning. For purposes of illustration, flash memory will be used. The flash memory contains data at a file level and as known disk sectors such as the boot sector and partition tables. During power down or entry into a hibernate mode, the computer system determines the static and dynamic configuration data to be stored in flash memory based on a history of prior uses. Data is also stored in the flash memory during system operation to reduce the number of times the disk drive is spun up. For pocket PCs and the like, reducing the number of times the disk drive is spun up improves user experience because the disk drive of pocket PCs is loud and annoying to the user. When the computer system is powered up or awakened from hibernation, the configuration data in flash memory is initialized while the disk drive is spinning up.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
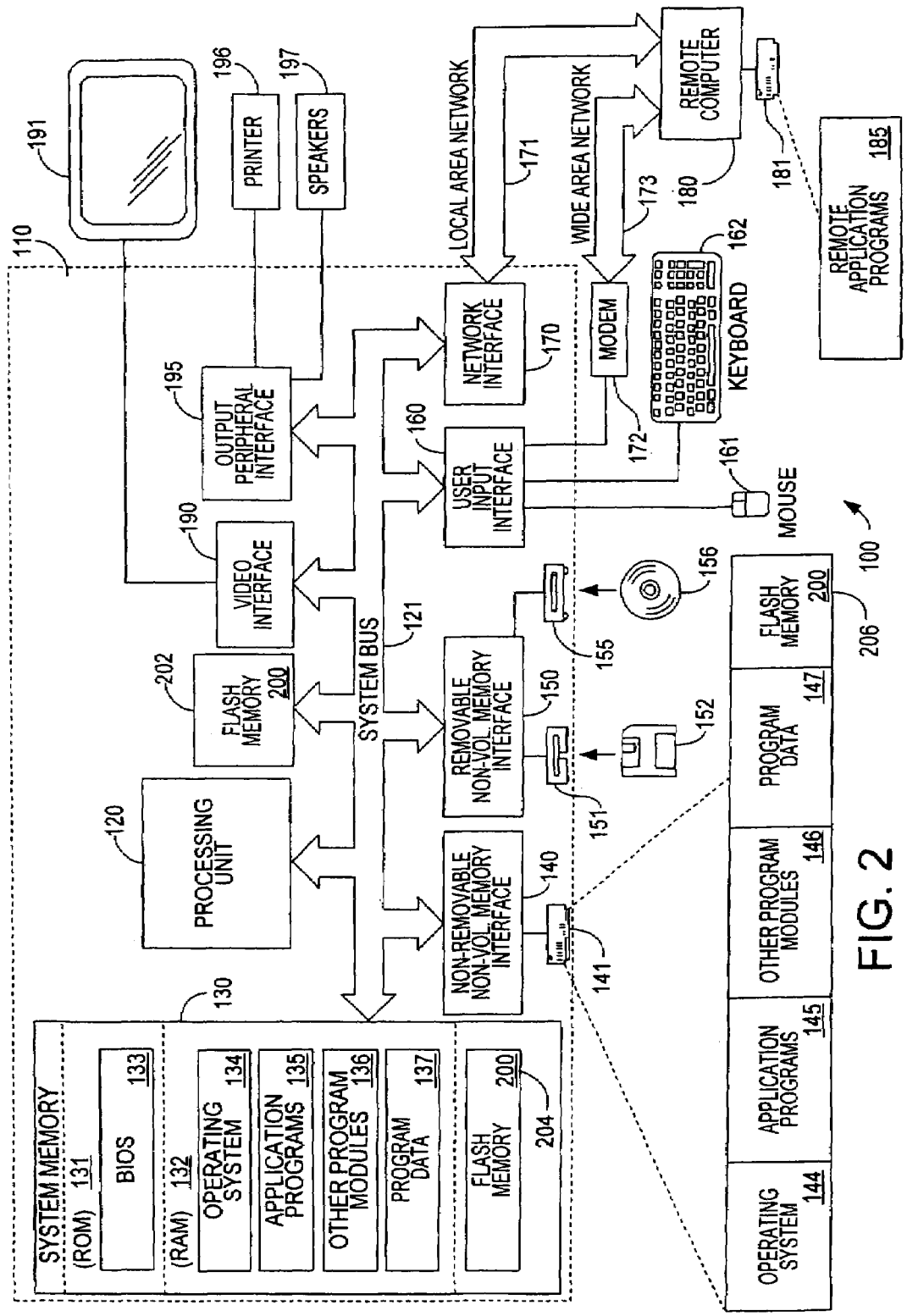
FIG. 2 is a block diagram of the exemplary computer system of FIG. 1 generally illustrating locations where the present invention may be implemented.

Turning now to FIG. 2, the flash memory 200 may be located in the computer 110 as a separate component 202 of the computer 110 such as a card to be put in a pc slot or as a component 204 in system memory. Alternatively, it could be a component 206 of a persistent storage device 300 such as a hard drive 141, in a docking station of a notebook device and the like.

Figure 3:
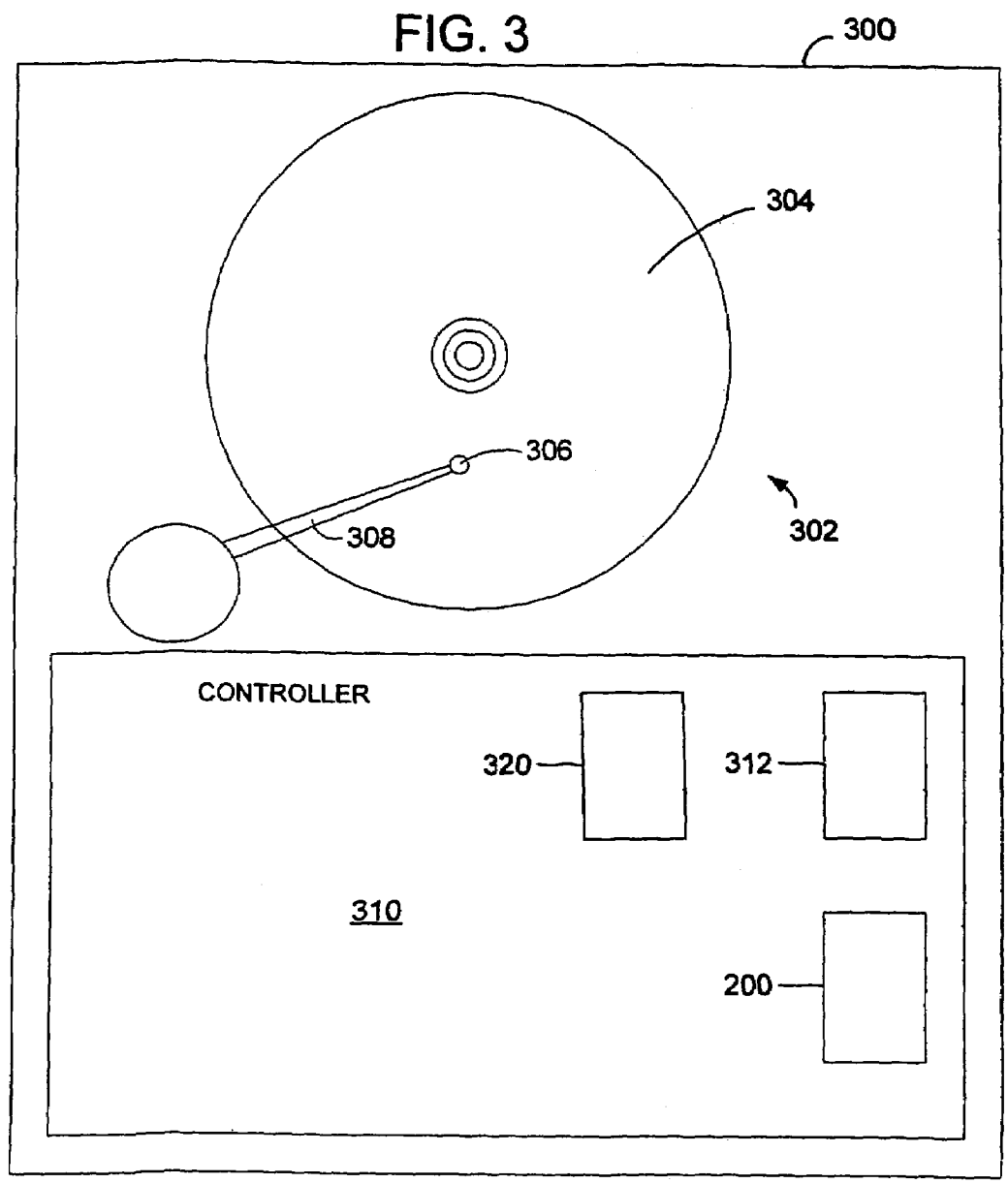
FIG. 3 is a top view illustrating a disk drive embodying the invention.

Turning now to FIG. 3, the persistent storage device 300 has a disk assembly 302 that includes a non-volatile memory storage medium such as one or more disks 304, a read/write head 306 for reading and writing to the disk 304, and a spindle/armature assembly 308 for moving the read/write head 304 to locations on the disk 304. The controller 310 commands the disk assembly to read data from the storage medium or write data to the storage medium. A cache memory 312 is used to buffer data being read from or written to the storage medium. The flash memory 200 of the present invention is located within the controller 310 or as a separate component of the persistent storage device 300. In one embodiment, the flash memory 200 is exposed to the computer 110 to appear as a sector of the disk 304. No change to the IDE (Integrated Drive Electronics) or SCSI (Small Computer System Interface) specifications is required. The computer 110 can detect the presence of flash memory by observing access times of 500 microseconds or less for large regions of the disk 304 instead of the typical times of approximately 10 milliseconds.

Figure 4:
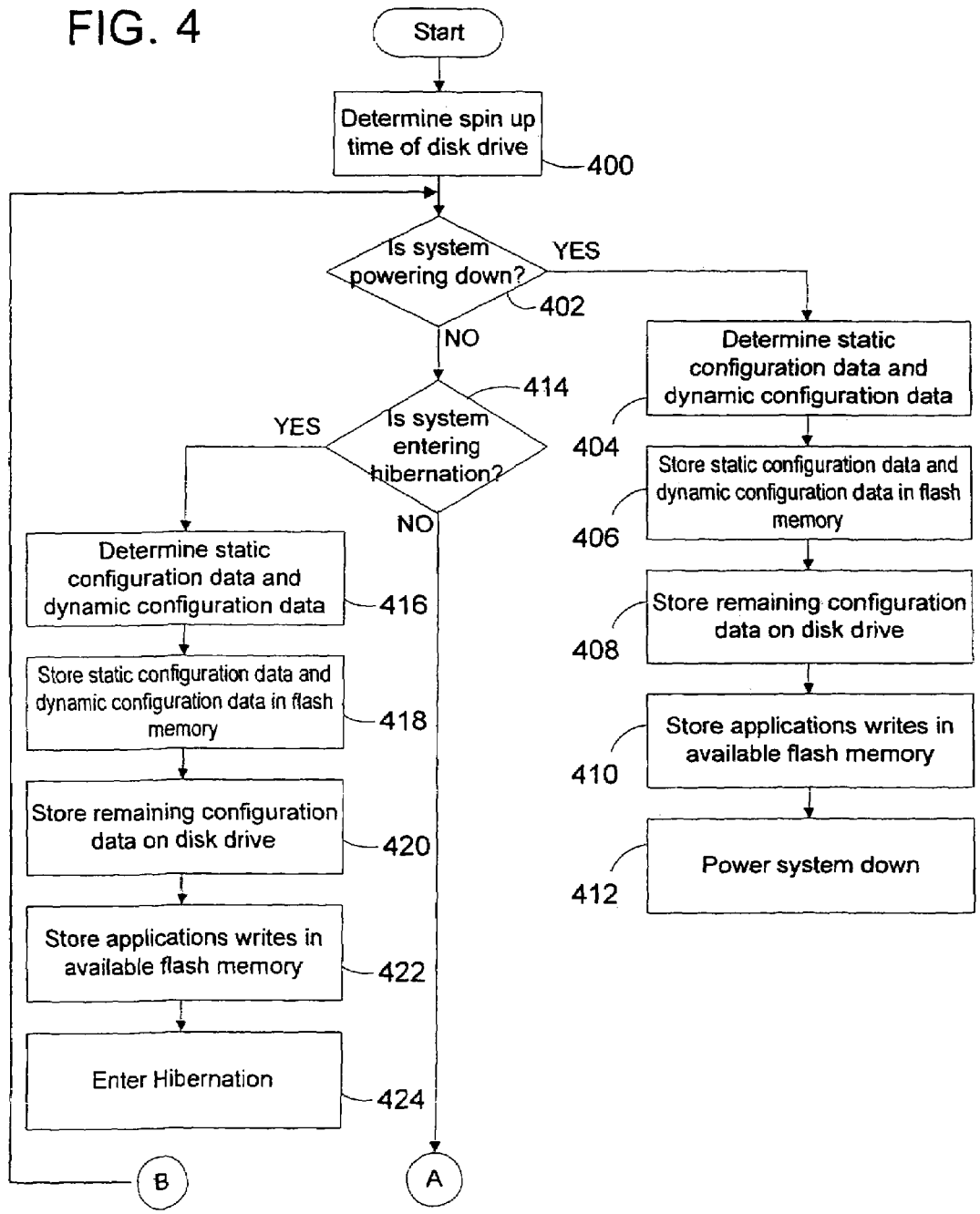
FIG. 4 is a flow chart illustrating a first portion of a process for storing static and dynamic configuration data during power-down or entering into a hibernate mode in order to decrease a boot time and awaken time of a computer system.
Figure 5:
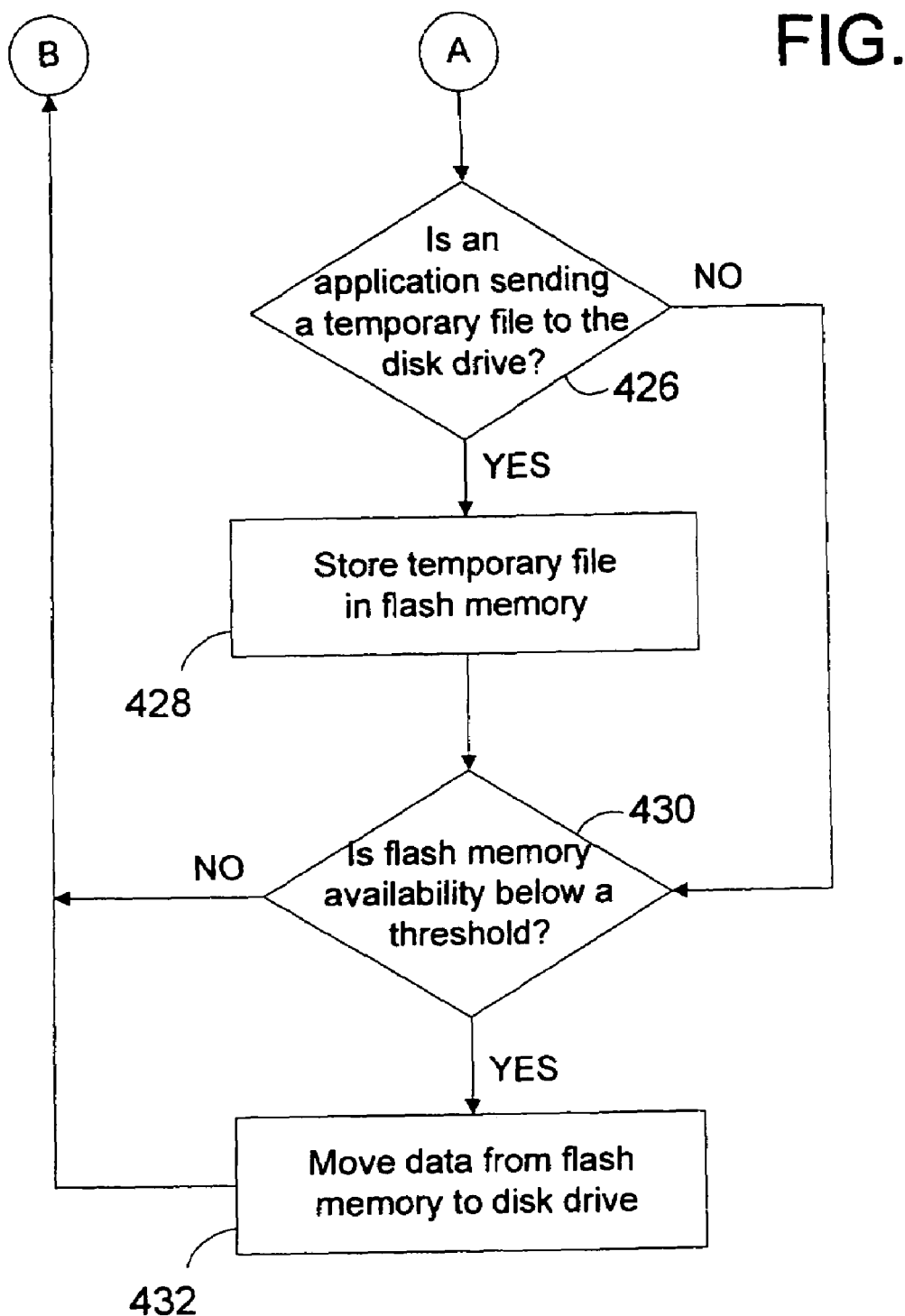
FIG. 5 is a flow chart illustrating a remaining portion of the process for storing static and dynamic configuration data during power-down or entering into a hibernate mode in order to decrease a boot time and awaken time of a computer system.

Operation of the present invention will now be described with reference to FIGS. 4 to 6. It should be noted that the steps described below can be performed sequentially, in parallel, or a combination of sequential and parallel. The spin-up time of the disk 304 is determined (step 400). For relatively small disks spinning at relatively slow speeds, the spin-up time is typically 5 to 6 seconds. For larger disks, multi-platter disks, and disks spinning at faster speeds, the spin-up time approaches 10 to 12 seconds. In one embodiment, the spin-up time is inferred by determining the time it takes to load a page into system memory from the disk drive that is not spinning (i.e., not being accessed). The spin-up time is approximately equal to the load time because the load time is dominated by the spin-up time.

When the computer system is to be powered down (step 402), the static configuration data and dynamic configuration data to be stored in flash memory is determined (step 404). The static configuration data and dynamic configuration data is selected so that the time of initializing the static configuration data and dynamic configuration data is approximately equal to the spin-up time of the disk drive. The static and dynamic configuration data is configuration data that does not need data from the disk drive to be initialized. It may include keyboard devices, pointing devices, the USB subsystem, the video subsystem, and the like. The size of the flash memory required is equal to the size of the static configuration data and dynamic configuration data. In many operating systems, the size of the flash memory needed ranges from 16 MB to 64 MB. 128 MB of flash memory may be needed to reduce the cost of CPU compression in some operating systems.

The static configuration data is system configuration data that is used for all users. For example, in the Windows™ operating system, the static configuration data includes boot strapping code to load the static and dynamic configuration data stored on flash memory and the configuration data stored on the disk drive. Other static configuration data in the Windows™ operating system includes files necessary to initialize the kernel such as registry initialization (smss.exe), video initialization (csrss.exe), the shell, services that run from dynamic link libraries (svchost.exe), security services (lsass.exe) such as IPSec and network login. For a computer system that is powering down, the static configuration data that is stored in flash memory includes the boot strapping code, kernel initialization files, the video initialization files, the shell, and services (e.g., dynamic link libraries) that are needed while the disk drive is spinning up.

The dynamic configuration data is system configuration data that is on a per-user basis. For example, dynamic configuration data includes desktop settings (e.g., background image, icon location, etc.), security credentials, internet favorite files, fonts, start-up programs, keyboard settings, personal data files such as scheduled tasks, financial information, and the like. For a computer system that is powering down, the dynamic configuration data that is stored in flash memory includes the desktop settings, keyboard settings, and security credentials.

The selected static configuration data and dynamic configuration data is stored in the flash memory 200 (step 406). The remaining configuration data is stored on the disk drive (step 408). In one embodiment, the amount of flash memory is larger that the minimum size required. Power down of the system is decreased by storing data that is being sent to the disk for storage that the operating system can not control such as an application writing to the disk to the flash memory 200 for storage (step 410). This reduces the number of writes to the disk, which results in a faster power down time. The computer system is then powered down.

If the system is going into hibernation (step 414), similar steps occur. Static configuration data and dynamic configuration data to be stored in flash memory is determined (step 416) and stored in memory (step 418). This data is the data that is necessary to "repaint" (i.e., restore) the graphical user interface quickly. The static configuration data includes kernel initialization: files, the video initialization files, the shell and services that run from dynamic link libraries that were in use prior to hibernation. The dynamic configuration data includes desktop settings, keyboard settings, fonts and the personal data files that were being used prior to hibernation.

The remaining configuration data is stored on the disk drive (step 420). Writes received from applications are stored in available flash memory first and stored on the disk drive if the flash memory is not available (step 422). The computer system then enters hibernate mode (step 424).

In one embodiment, the flash memory is used during system operation. If an application or the operating system is sending data to the disk for storage (step 426), the data is stored in the flash memory 200 (step 428). When the system is being powered down or entering hibernation, the data stored in flash memory 200 is transferred to the disk drive. If the flash memory available space falls below a threshold (step 430), the data in the flash memory is transferred to the disk drive (step 432). Storing the data in flash memory decreases the number of times the disk drive is spun-up during operation. This improves a user's experience with computing devices, and pocket sized devices in particular, because the noise of the disk drive spinning and writing data to disk is not heard as often.

Figure 6:
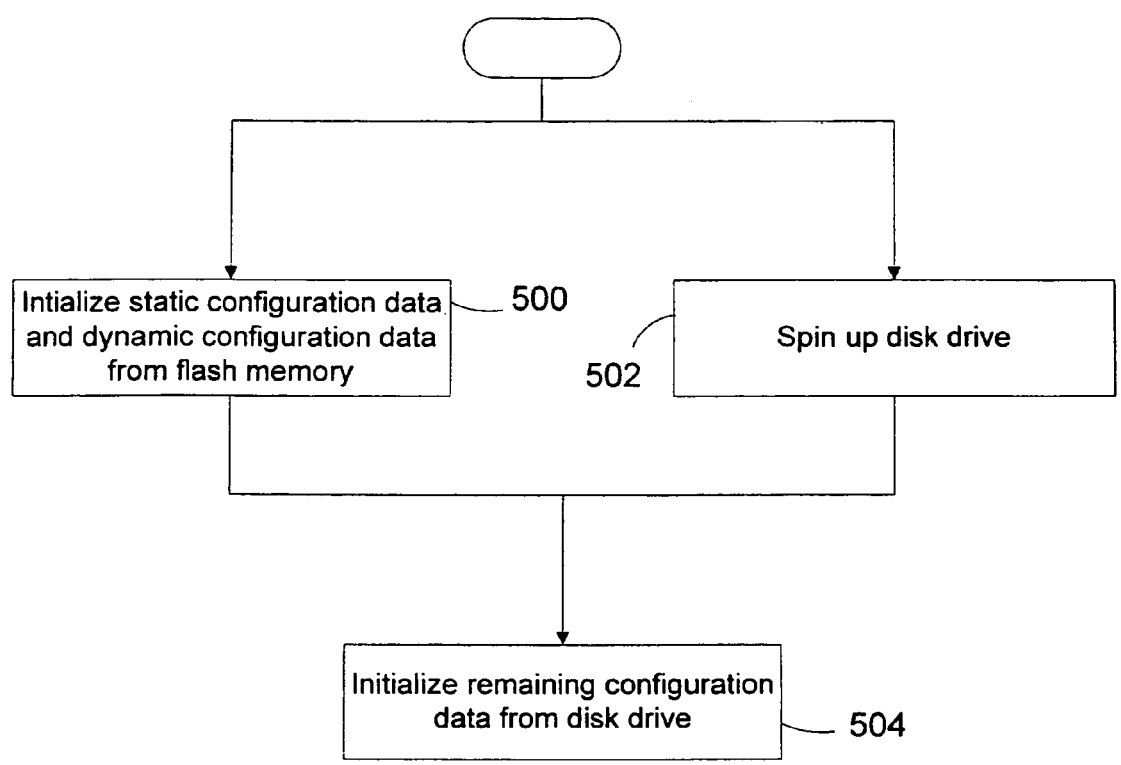
FIG. 6 is a flow chart illustrating a process for decreasing a boot time of a computer system and an awaken time from hibernation of a computer system.

FIG. 6 illustrates the steps taken to boot the computer system or restore the computer system from hibernate mode. When the computer system boots from the disk drive or wakes from the hibernate mode, the computer system initializes the static configuration data and dynamic configuration data stored in the flash memory 200 (step 500) during the time that the disk drive is spinning up (step 502). This effectively eliminates the spin-up time of the disk drive from the boot time and the wake time. Once the disk drive has spun up, the remaining configuration data that is stored on the disk drive is initialized (step 504). The experience the user sees is that when the user hits the power button, she should see a responsive interactive logon screen by the time of or shortly after the time that the monitor 191 or other type of display device turns on instead of having to wait for the disk drive to spin up. During the time the user clicks on her user icon and types in her password, the services needed to display the desktop are initialized. A responsive and usable desktop is shown to the user after the disk spins up and the data in the flash is verified to be consistent with the data on the disk drive. In one embodiment, all of the cached data is not compared. However, if there are mismatches within the partition or file system metadata, the computer system needs to bug-check and enter a service/help mode such that a slow boot can be attempted at next boot. A help button or switch can be used to bypass the flash memory and turn on the computer system in safe mode for recovery and backward compatibility purposes.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer system comprising:
   an operating system;
   a first persistent storage device having a first access time, wherein the operating system is stored on the first persistent storage device;

a second persistent storage device having a second access time shorter than the first access time, wherein a portion of the operating system is selected for storage on the second persistent storage device when one of the computer is being powered down and the computer is entering a hibernation mode;

a non-persistent storage device, wherein the portion of the operating system selected for storage on the second persistent storage device is initialized into the non-persistent storage device while the first persistent storage device is powering up.

2. The computer system of claim 1, wherein the first persistent storage device is a hard drive, the second persistent storage device is a flash memory device, and the non-persistent storage device is system random access memory.

3. The computer system of claim 2, wherein the flash memory has a size sufficient to store the portion of the operating system selected for storage such that a time of loading the portion of the operating system into the non-persistent storage device is approximately equal to the first access time for the first persistent memory device.

4. The computer system of claim 2, wherein the flash memory appears to a computer system as at least one sector of the hard drive.

5. The computer system of claim 4, wherein the operating system detects the presence of the flash memory by observing access times of a portion of the hard drive.

6. The computer system of claim 1, wherein the first persistent storage device is a hard drive and the second persistent storage device is track buffer memory of the hard drive.

7. The computer system of claim 1, wherein the second persistent storage device stores static configuration data and dynamic configuration data when one of the computer is being powered down and the computer is entering a hibernation mode.

8. The computer system of claim 7, wherein the static configuration data is non-user identity specific and the dynamic configuration data is user-specific.

9. The computer system of claim 7, wherein the static configuration data comprises data associated with one of boot strapping code, kernel initialization files, video initialization files, shell and services files.

10. The computer system of claim 9, wherein the services files include dynamic link libraries.

11. The computer system of claim 7, wherein the dynamic configuration data comprises data associated with one of desktop settings, security credentials, internet favorite files, fonts, start-up programs, keyboard settings, and personal information files.

12. The computer system of claim 7, wherein the operating system determines the static configuration data and dynamic configuration data based on a history of prior use.

13. The computer system of claim 1, wherein the second persistent storage device is located within the first persistent storage device.

14. The computer system of claim 1, wherein the second persistent storage device is located in one of a docking station of a laptop, a pc card, and a on a computer motherboard.

15. The computer system of claim 1, wherein the operating system determines if the static configuration data and dynamic configuration data stored in the second persistent storage device is consistent with data stored on the first persistent storage device.

16. The computer system of claim 15, wherein the operating system enters a service mode when the configuration data stored in the second persistent storage device is inconsistent with the data stored in the first persistent storage device.

17. The computer system of claim 15, wherein the operating system boots using only the first persistent memory device when an inconsistency is detected.

18. The computer system of claim 15, wherein the operating system provides an option to bypass the flash memory when the computer system is booting.

* * * * *

UNITED STATES PATENT AND TRADEMARK OFFICE
CERTIFICATE OF CORRECTION

| | | |
|---|---|---|
| PATENT NO. | : 7,107,444 B2 | |
| APPLICATION NO. | : 11/204705 | |
| DATED | : September 12, 2006 | |
| INVENTOR(S) | : Michael R. Fortin et al. | |

It is certified that error appears in the above-identified patent and that said Letters Patent is hereby corrected as shown below:

At Column 10, line 21, "and a on a" should be -- and on a --.

Signed and Sealed this

Tenth Day of April, 2007

JON W. DUDAS
*Director of the United States Patent and Trademark Office*